US009002125B2

(12) United States Patent
Schneider et al.

(10) Patent No.: US 9,002,125 B2
(45) Date of Patent: Apr. 7, 2015

(54) Z-PLANE COMPRESSION WITH Z-PLANE PREDICTORS (71) Applicant: NVIDIA Corporation, Santa Clara, CA (US)

(72) Inventors: Bengt-Olaf Schneider, Yorktown Heights, NY (US); Christian Amsinck, Cary, NC (US)

(73) Assignee: NVIDIA Corporation, Santa Clara, CA (US)

( * ) Notice: Subject to any disclaimer, the term of this patent is extended or adjusted under 35 U.S.C. 154(b) by 108 days.

(21) Appl. No.: 13/652,333

(22) Filed: Oct. 15, 2012

(65) Prior Publication Data
US 2014/0105513 A1 Apr. 17, 2014

(51) Int. Cl.
G06K 9/36 (2006.01)
G06T 9/00 (2006.01)
G06T 15/00 (2011.01)

(52) U.S. Cl.
CPC ... *G06K 9/36* (2013.01); *G06T 9/00* (2013.01); *G06T 15/005* (2013.01)

(58) Field of Classification Search
CPC ............ G06T 3/40; G06T 19/00; G06T 3/00; G01N 2015/1447; G01N 2015/1452; G02B 21/367
USPC .......... 382/232, 238, 240, 250, 251; 348/394, 348/409, 419; 358/426.02, 426.11
See application file for complete search history.

(56) References Cited

U.S. PATENT DOCUMENTS

| 4,864,629 | A | 9/1989 | Deering |
| 5,430,464 | A | 7/1995 | Lumelsky |
| 5,500,939 | A | 3/1996 | Kurihara |
| 5,841,447 | A | 11/1998 | Drews |
| 5,886,701 | A | 3/1999 | Chauvin et al. |
| 5,949,428 | A | 9/1999 | Toelle et al. |
| 6,016,474 | A | 1/2000 | Kim et al. |
| 6,057,855 | A | 5/2000 | Barkans |
| 6,141,740 | A | 10/2000 | Mahalingaiah et al. |
| 6,314,493 | B1 | 11/2001 | Luick |
| 6,438,664 | B1 | 8/2002 | McGrath et al. |
| 6,476,807 | B1 | 11/2002 | Duluk, Jr. et al. |
| 6,492,991 | B1 | 12/2002 | Morein et al. |
| 6,496,193 | B1 | 12/2002 | Surti et al. |
| 6,545,683 | B1 | 4/2003 | Williams |
| 6,690,381 | B1 | 2/2004 | Hussain et al. |
| 6,750,870 | B2 | 6/2004 | Olarig |
| 6,825,847 | B1 | 11/2004 | Molnar et al. |
| 6,839,062 | B2 | 1/2005 | Aronson et al. |
| 6,891,543 | B2 | 5/2005 | Wyatt |

(Continued)

OTHER PUBLICATIONS

Parhami, Computer Arithmetic, Oxford University Press, Jun. 2000, pp. 413-418.

(Continued)

*Primary Examiner* — Ali Bayat (57) ABSTRACT

A method for compressing graphics data comprises selecting z-planes from a plurality of z-planes. The selected z-planes are predictor z-planes. A residual is determined for each sample not covered by one of the predictor z-planes. A sample is covered by one of the predictor z-planes when the predictor z-plane correctly defines a z-value of the sample. A residual comprises a value that is a difference between a predicted z-value provided by one of the predictor z-planes and an actual z-value for the sample. The predictor z-planes and the residuals are stored in a z-buffer.

20 Claims, 10 Drawing Sheets

Z-plane compression with 2 z-planes.
Coverage mask: 0000.0000.0111.1111

(56) References Cited

U.S. PATENT DOCUMENTS

| | | |
|---|---|---|
| 7,015,909 B1 | 3/2006 | Morgan, III et al. |
| 7,170,515 B1 | 1/2007 | Zhu |
| 7,218,291 B2 | 5/2007 | Abdalla et al. |
| 7,486,290 B1 | 2/2009 | Kilgariff et al. |
| 7,616,202 B1 | 11/2009 | Chen et al. |
| 7,692,659 B1 | 4/2010 | Molnar et al. |
| 2001/0038642 A1 | 11/2001 | Alvarez, II et al. |
| 2003/0001857 A1 | 1/2003 | Doyle |
| 2003/0122820 A1 | 7/2003 | Doyle |
| 2003/0160798 A1 | 8/2003 | Buehler |
| 2004/0130552 A1 | 7/2004 | Duluk, Jr. et al. |
| 2004/0205281 A1 | 10/2004 | Lin et al. |
| 2005/0093873 A1 | 5/2005 | Paltashev et al. |
| 2005/0140682 A1 | 6/2005 | Sumanaweera et al. |
| 2006/0170703 A1 | 8/2006 | Liao |
| 2010/0074489 A1* | 3/2010 | Bacus et al. .................. 382/128 |
| 2010/0296747 A1* | 11/2010 | Srinidhi ........................ 382/239 |
| 2011/0181622 A1* | 7/2011 | Bacus et al. .................. 345/634 |
| 2012/0183215 A1 | 7/2012 | Van Hook et al. |
| 2013/0021352 A1 | 1/2013 | Wyatt et al. |

OTHER PUBLICATIONS gDebugger, graphicRemedy, http://www.gremedy.com, Aug. 8, 2006.

Duca, et al., A Relational Debugging Engine for Graphics Pipeline, International Conference on Computer Graphics and Ineractive Techniques, ACM SIGGRAPH 2005, pp. 453-463, ISSN: 0730-0301.

* cited by examiner

Z-plane compression with 2 z-planes.
Coverage mask: 0000.0000.0111.1111

Arithmetic compression for 3 z-planes (ZP0, ZP1, and ZP2).
Predictor Planes: ZP0, ZP2
Samples for ZP1 predicted by ZP1.
Coverage mask: 0000.0000.0111.1111
Residual mask : 0000.0000.0011.0001

Figure 5

Arithmetic compression for 4 z-planes (ZP0, ZP1, ZP2, & ZP3).
Convex surface.
Predictor Planes: ZP0, ZP3.
All residuals have the same sign, i.e. the predictor is always behind the predicted samples.

Figure 6

Arithmetic compression for 4 z-planes (ZP0, ZP1, ZP2, & ZP3).
Background plane (ZP0).
Predictor Planes: ZP0
All residuals have the same sign, i.e. the predictor is always behind the predicted samples.

Z-PLANE COMPRESSION WITH Z-PLANE PREDICTORS

TECHNICAL FIELD

The present disclosure relates generally to the field of frame buffer compression methods and more specifically to the field of z-buffer compression methods.

BACKGROUND

Figure 1:
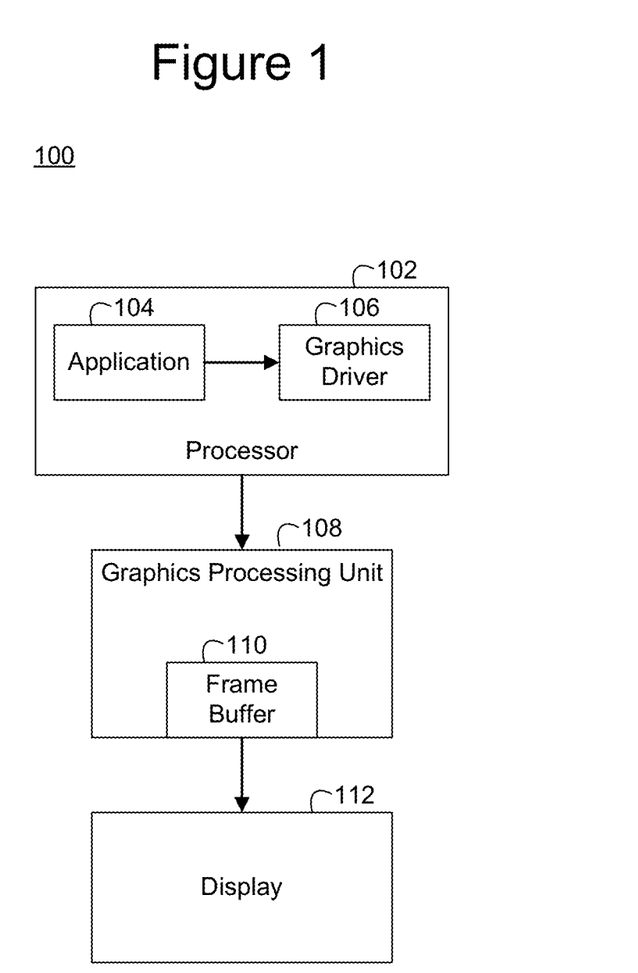
FIG. 1 illustrates an exemplary simplified block diagram of a computer system with a graphics processing unit that stores compressed graphics information in a frame buffer in accordance with the prior art.

A frame buffer is a common component in many conventional graphics processing systems. A frame buffer may comprise one or more memory buffers (e.g., a z-buffer) that are used to contain at least one complete frame of data for communication to a video display device. As illustrated in FIG. 1, an exemplary computer system 100 comprises a processor 102 operable to execute software applications 104 and a graphics processing unit 108 operable to receive graphics information from the software applications 104 and to process video and graphics information and deliver it for display by a display device 112. As illustrated in FIG. 1, the processor 102 is operable to execute software applications 104 that interact with graphics drivers 106 and deliver video and graphics information to the graphics processing unit 108 for processing. An exemplary graphics processing unit 108 may comprise a frame buffer 110 operable to store graphics e.g., pixel data necessary for at least one complete frame of data to be displayed by the display device 112. The contents of the frame buffer 110 may also be read out by the graphics processing unit 108, processed, and updated with current graphics data during rendering.

Figure 2:
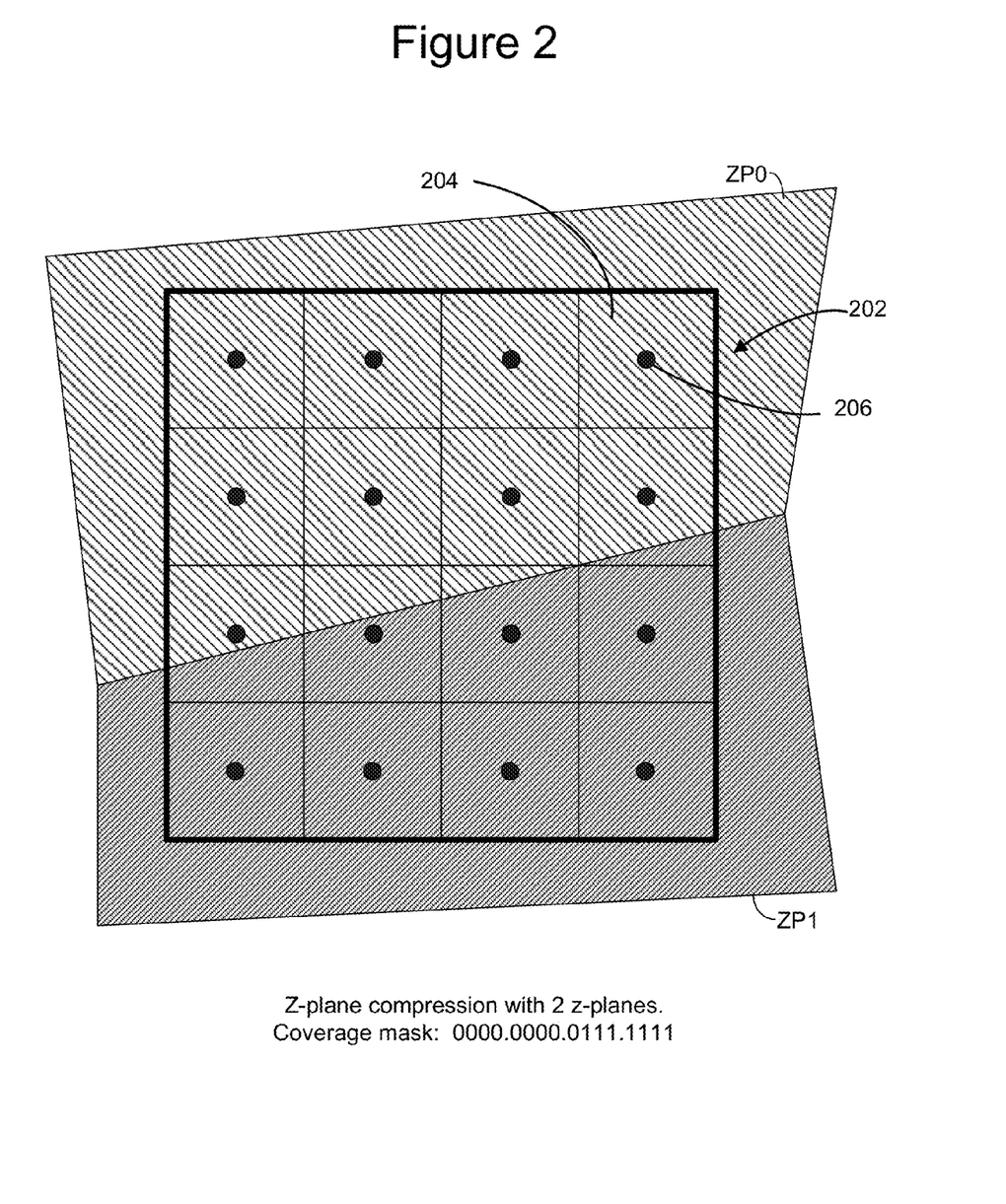
FIG. 2 illustrates an exemplary schematic illustration of a tile of a frame buffer in accordance with the prior art.

As illustrated in FIG. 2, graphics information stored in a frame buffer memory 110 may be divided into tiles 202. Each tile 202 may comprise one or more display pixels 204. An exemplary tile may have a rectangular shape or a square shape. A tile 202 may comprise a variety of different pixel quantities (e.g., 12 pixels/tile and 64 pixels/tile). As illustrated in FIG. 2, an exemplary tile 202 may comprise 16 pixels 204 arranged into a 4×4 array. As also illustrated in FIG. 2, a tile 204 may contain a plurality of objects 208, 210 that cover one or more pixels 204 of the tile 202.

A tile 202 may be covered by any number of objects. An object is a generic term and may represent for example: triangles, layers, z-planes, or a collection of samples with a common property (e.g., color) that overlie pixels, etc. Rather than pixels 204, an exemplary tile 202 may also be referred to as comprising samples 206. An exemplary pixel 204 may comprise one or more samples 206. An exemplary pixel 204 may also comprise a multisample that is an average of all the color samples of the pixel 204.

Exemplary graphics data, such as distance or z-data, runs through a graphics pipeline in the graphics processing unit 108, where triangles may eventually be sorted by tiles 202. As discussed herein, the tiles 202 may be collections of pixels or any subset of the pixels to be displayed on the display 112. In one exemplary embodiment, data coming down the graphics pipeline (source data) may arrive in two different representations. A first representation comprises z-plane information that provides geometric descriptions of a particular plane for the associated z-data, described as Ax+By+C. The parameters A and B are the gradients of the z-plane in x and y respectively. The parameter C is the distance of the z-plane from the origin, e.g., the center of the tile. Thus, these parameters fully describe the orientation and placement of the z-plane in space. A second representation comprises individual z values for each sample or pixel, such that individual depth or distance values for each sample or pixel of a tile are specified directly. In one exemplary embodiment, z-planes are evaluated at sample locations. For non-antialiased or non-multisampled rendering, there is only one sample per pixel. When there is only a single sample for a pixel, a sample is equivalent to a pixel, otherwise, a pixel comprises a plurality of sample values.

In addition to the source data, there is also exemplary destination data, representing the geometry that has already been rendered to the frame buffer (e.g., a z-buffer). One or more compression algorithms may have been applied to this data, such that it can be either in a compressed or an uncompressed state, or it could be subdivided into tiles or other regions, and partially compressed in some regions and uncompressed in others. When z-data is stored in the z-buffer in an uncompressed representation, individual distance values for each sample are stored. When z-data is compressed for storage in the z-buffer, the z-data may be stored using z-plane representations, which as discussed herein comprise a geometric description (Ax+By+C) for each z-plane and a coverage mask for each z-plane.

A comparison may be made between the destination data that has already been rendered and the new source data. This new data may be used to update the z-data stored in the z-buffer. For an exemplary tile 202, destination data stored in the z-buffer may be read out and compared to source data to determine which fragments are visible at the tile 202 according to their associated distance data (a fragment may be considered a collection of samples with a common property (e.g., color) that overlie pixels, etc.). The z-values are compared to determine which fragments are visible. The results may then be written back into the z-buffer as updated result information. This updated result information is now updated destination data.

Exemplary z-data may arrive as one or more z-planes (the first representation discussed above), or as individual z-data for each sample or pixel (the second representation discussed above). When the z-data is represented with z-planes, the z-planes (that is, the z-plane information) may be stored in the z-buffer. Storing the z-data as z-planes allows for the compression of the z-data. In other words, rather than storing individual z-values for each sample, one or more z-planes (and their associated coverage masks) representing the z-values may be stored in the z-buffer instead. When z-data is represented by individual distance values for each sample (the second representation), there will not be any compression, as z-data for each sample will need to be stored in the z-buffer. Because graphic geometries are getting finer, individual z-planes are also covering an ever smaller number of screen pixels, which results in potentially greater numbers of z-planes for a given tile. Conventional z-data compression techniques (using z-plane representations) are only able to store a limited number of z-planes. When this limit is reached, the z-data must be stored uncompressed in the z-buffer.

SUMMARY OF THE INVENTION

Embodiments of this present invention provide solutions to the challenges inherent in compressing and storing z-data with z-planes. In a method according to one embodiment of the present invention, a method for compressing graphics data is disclosed. The method comprises selecting z-planes from a plurality of z-planes as predictor planes. A residual is determined for each sample not covered by one of the predictor planes. A sample is covered by one of the predictor planes when the predictor plane correctly defines a z-value for the sample. A residual comprises a value that is a difference between a predicted z-value provided by one of the predictor z-planes and an actual z-value for the sample. The predictor planes and the residuals are stored in a z-buffer.

In a system according to one embodiment of the present invention, a system for compressing graphics data is disclosed. The system comprises a processor and a memory. The memory comprises instruction that when executed by the processor implement a method for compressing graphics data. The method comprises selecting two z-planes from a plurality of z-planes as predictor planes. A residual is determined for each sample not covered by one of the predictor planes. A sample is covered by one of the predictor planes when the predictor plane correctly defines a z-value for the sample. A residual comprises a value that is a difference between a predicted z-value provided by one of the predictor z-planes and an actual z-value for the sample. The predictor planes and the residuals are stored in a z-buffer.

In another method according to one embodiment of the present invention, a method for compressing graphics data is disclosed. The method comprises selecting a z-data compression procedure from a plurality of z-data compression procedures. A compression procedure compresses z-data by selecting one or more z-planes to represent the z-data. The selecting a z-data compression procedure from a plurality of z-data compression procedures is based upon an evaluation of at least one criterion of a plurality of criteria. The selected z-planes are stored in a z-buffer.

BRIEF DESCRIPTION OF THE DRAWINGS

The embodiments of the present invention will be better understood from the following detailed description, taken in conjunction with the accompanying drawing figures in which like reference characters designate like elements and in which.

DETAILED DESCRIPTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or display devices.

When a component appears in several embodiments, the use of the same reference numeral signifies that the component is the same component as illustrated in the original embodiment.

Compressing and Storing Z-Data as One or More Z-Planes:

Embodiments of this present invention provide solutions to the increasing challenges inherent in compressing z-data. Various embodiments of the present disclosure provide improved compression methods that allow z-data represented by z-planes to be stored in a z-buffer even when there are too many visible z-planes for conventional storage in the z-buffer. As discussed in detail below, from a plurality of z-planes visible at a tile, two z-planes may be selected as predictor z-planes. Distance data for each of the samples/pixels of the tile not covered by one of the predictor z-planes will be saved as residuals in the z-buffer. The two selected predictor z-planes and the associated residuals may be saved in the z-buffer regardless of the number of visible z-planes so long as the quantity of bits required to store the residuals is below a threshold.

An exemplary z-compression process may compress z-data by storing up to a predetermined quantity of z-planes (e.g., N z-planes) representing the z-data, instead of the individual z-values. In one exemplary embodiment, a maximum of four z-planes may be stored for each tile. However, once five or more z-planes are visible in a tile, the tile's z-data must be stored in an uncompressed format. In other words, a depth or distance value (z-data) will be saved for each sample/pixel in the tile. As illustrated in FIG. 2, for a tile with two primitives visible, two associated z-planes ZP0, ZP1 may be stored in the z-buffer. A coverage mask for the visible z-planes indicates which z-plane covers a particular sample/pixel. For the exemplary scenario, illustrated in FIG. 2, the coverage mask values would be 0000|0000|0111|1111. In this example, each bit in the coverage mask corresponds to one sample or pixel in the tile. The bits are stored in row-major form, with the left-most bit corresponding to the top-left sample. If a bit is 0 (1) the corresponding sample or pixel is covered by ZP0 (ZP1). As discussed herein, a sample or pixel is covered by a z-plane when the z-plane exactly represents the surface for these samples or pixels. If a tile contains more than 2 z-planes, there can be various ways to represent which z-plane covers which sample(s).

Figure 3:
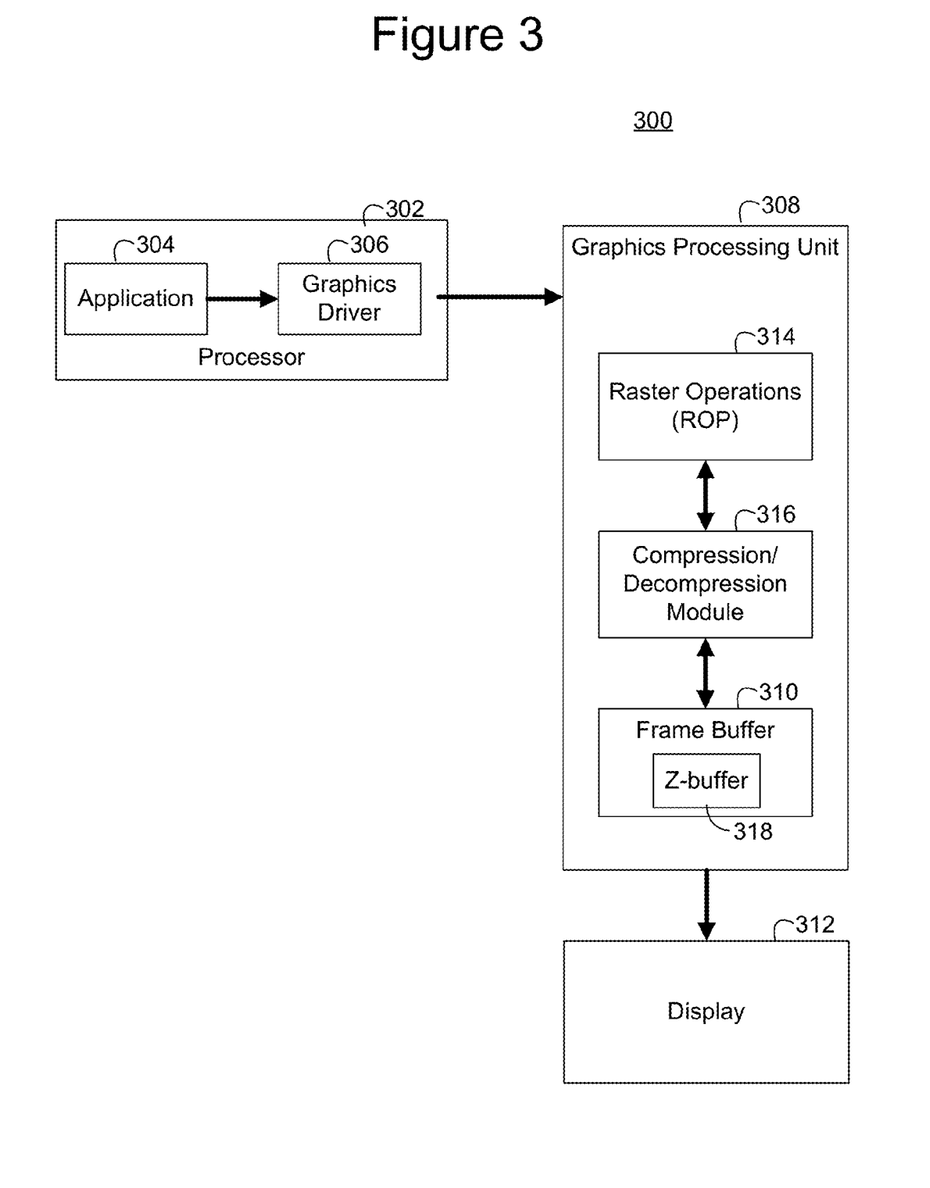
FIG. 3 illustrates an exemplary simplified block diagram of a computer system with a graphics processing unit that stores z-planes as compressed representations of z-data for a tile in a frame buffer in accordance with an embodiment of the present invention.

FIG. 3 illustrates an exemplary computer system 300 with a graphics processing unit 308 operable to compress z-data for storage in a z-buffer, utilizing z-planes regardless of the number of visible z-planes, as discussed herein. As illustrated in FIG. 3, computer system 300 comprises a processor 302 operable to execute software applications 304 and a graphics processing unit 308 operable to receive scene information from the software applications 304 and to process the scene information and deliver it for display by a display device 312. As illustrated in FIG. 3, an exemplary processor 302 is operable to execute software applications 304 that interact with graphics drivers 306 and deliver graphics information to the graphics processing unit 308 for processing. In one embodiment, an exemplary graphics processing unit 308 comprises a frame buffer 310 with a z-buffer 318 operable to store destination z-data (distance data) that may be read out by the graphics processing unit 308 to compare to a newly arrived source z-data. As discussed herein, the graphics processing unit 308 may also read out the z-data from the z-buffer 318 for further processing with the source z-data.

As also illustrated in FIG. 3, an exemplary graphics processing unit 308 comprises a raster operations (ROP) 314 and a compression/decompression module 316. In the ROP module 314, coverage masks for those fragments visible at a particular tile may be adjusted after various tests have been performed (e.g., alpha, clipping, depth-bounds, stencil, and depth). A final coverage mask defines the fragments visible and which samples or pixels are covered by which primitives. Exemplary samples are those screen-space locations for which z-values (and associated color values) are computed. In the graphics processing unit 308, computations may be performed for every sample, e.g., in the ROP module 314, and the Frame Buffer 310 has storage for each sample. A final pixel value sent to the Display 312 may be computed from one or multiple sample values contributing to this pixel. The number of samples contributing to a pixel depends on the multisample or anti-aliasing mode.

As discussed herein, those samples or pixels and their associated display information may be updated in the frame buffer 310. For example, the z-data may be stored in the z-buffer 318. As described herein, the z-data may be stored uncompressed with z-data for each sample or pixel (such as when shader-z data is provided) or compressed using z-planes representing the z-data (when such z-plane representations are provided). As discussed herein, the destination z-data stored in the z-buffer 318 may be accessed for further processing and/or to be compared with new source z-data that is received via the graphics pipeline of the graphics processing unit 308. If the z-data stored in the z-buffer is compressed by the compression/decompression module 316, the compressed z-data may also be uncompressed by the compression/decompression module 316 before it is processed by the graphics processing unit 308 or any other module that processes depth information stored in the z-buffer 318. In one exemplary embodiment, the compressed z-data may also be read and processed directly or decompressed by the ROP 314.

Figure 4:
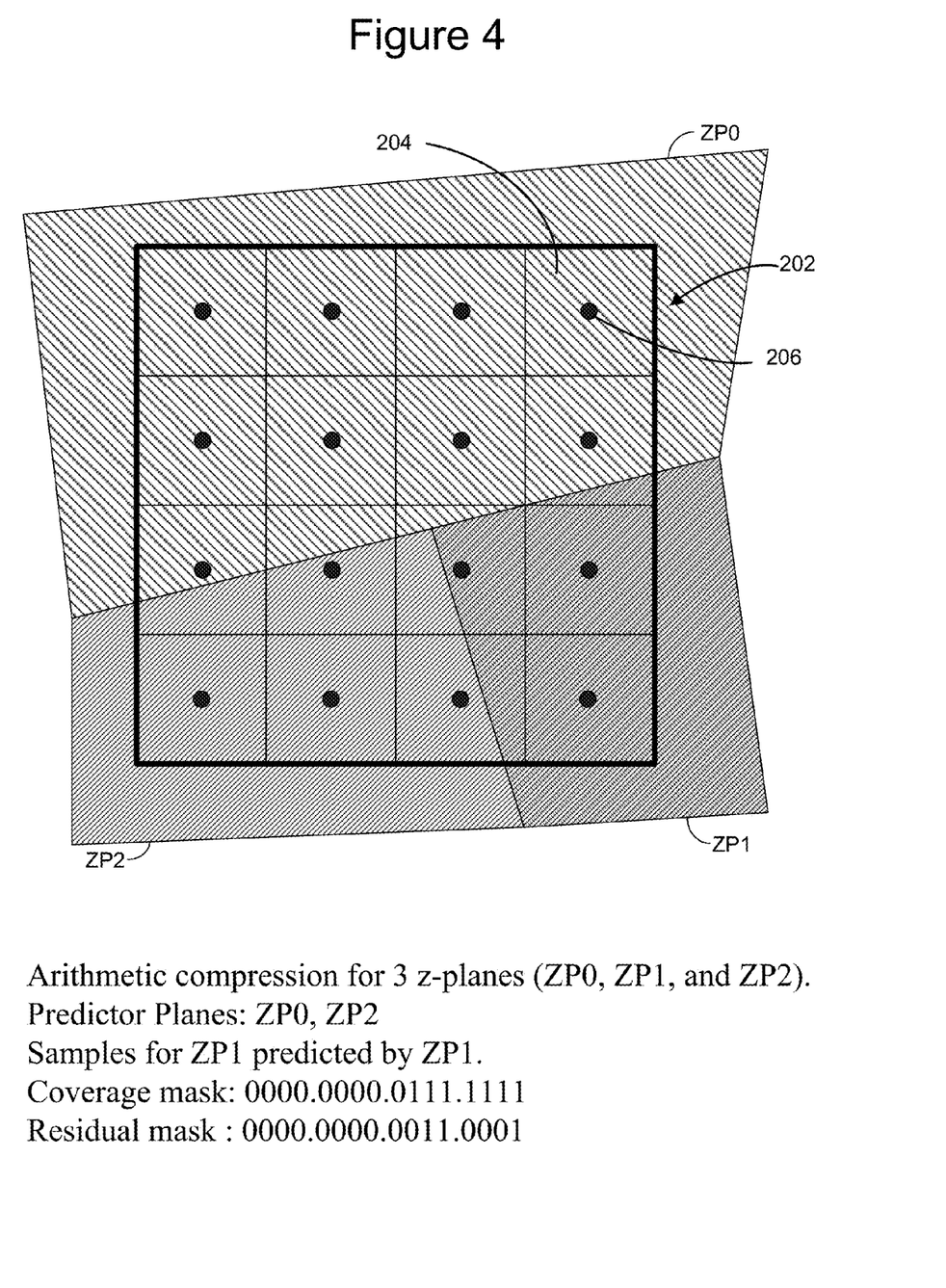
FIG. 4 illustrates an exemplary schematic illustration of a tile of a frame buffer covered by a plurality of z-planes in accordance with an embodiment of the present invention.

As illustrated in FIG. 4, to overcome the z-data compression limitations discussed above, an arithmetic z-compression format may be used. From the available z-planes representing the z-data, two z-planes are selected. The selected z-planes will be used as predictor z-planes. In one exemplary embodiment, the available z-planes comprise N destination planes and a source plane. In another embodiment, a quantity of K (instead of 2) predictor z-planes may be selected. For samples not covered by either plane (aka uncovered pixels) all predictor z-planes are evaluated to determine a closest predictor z-plane. For each uncovered sample, a residual is stored which represents a signed distance (z-data) of the sample from the closest predictor z-plane. In other words, a residual comprises a distance between a predicted z-value (as determined with the associated predictor z-plane) and an actual z-value of the sample.

In one exemplary embodiment, the predictor z-planes may be stored in the z-buffer 318 using the same format for storing z-planes as in the z-compression procedure described above. Residuals may be computed as full-precision signed integer differences between the predicted and actual pixel/sample z-values: residual(x,y)=z(x,y)−z_prediction(z,y). Residuals may be stored with a variety of formats so that they represent all residuals in the tile with a minimum number of bits. In a preferred embodiment, residuals may be stored as integer differences between predicted and actual z-values-even if the z-values themselves are floating-point numbers. Typically, the predicted and actual z-values only differ in their mantissa bits, and if the differences extend into exponent bits, the differences would probably be so large that compression will not succeed anyway. If all residuals are signed positive or negative, the residuals may be stored without a sign bit. The quantity of required bits/residuals will reflect that. In one exemplary embodiment, if all the residuals have a same sign (indicating that the predictor z-plane lies in front of or behind all the associated sample z-values), sign bits may indicate with a first bit whether all the residuals have a same sign, and a second bit to indicate what the sign is. The sign bits may be stored for each predictor z-plane.

In one exemplary tile, illustrated in FIG. 4, three primitives or objects are visible at a tile. As illustrated in FIG. 4, the objects are represented by z-planes (ZP0, ZP1, and ZP2). As illustrated in FIG. 4, z-planes ZP0 and ZP2 are selected as predictor z-planes, therefore, a coverage mask for z-planes ZP0 and ZP2 would be 0000|0000|0111|1111 (ZP0 and ZP2 indicated as 0 and 1, respectively). As illustrated in FIG. 4 and the coverage mask, those samples covered by z-plane ZP1 are "owned" by z-plane ZP2. Those samples owned by a predictor z-plane that are not completely covered or correctly defined by the associated predictor z-plane have residuals calculated. Those samples covered by z-plane ZP1 have residuals calculated, resulting in a residual mask of 0000|0000|001|0001.

As also illustrated in FIG. 4, the residual mask indicates which samples have residuals while the coverage mask indicates which predictor z-plane is used to predict those samples. Those samples that are covered and correctly defined by a predictor z-plane may be considered as perfectly predicted by the predictor z-plane, while those samples owned by a particular predictor z-plane but not perfectly predicted will have a residual calculated that is a difference between a predicted distance value and an actual distance value (z-data) of the subject sample. In other words, for those samples that are only approximated by the predictor z-plane, a residual will provide a distance value that allows the determination of a perfect z-value for the sample.

As also illustrated in FIG. 4, when the coverage mask and the residual mask are combined as a two-bit mask, a sample value of 00 indicates that the sample is perfectly predicted by the ZP0 predictor z-plane, while a sample value of 01 indicates that a sample is predicted by the ZP0 predictor z-plane, but also requires a residual (indicating that there is a real difference between the predicted z-value provided with the predictor z-plane and the actual z-value). A sample value of 10 indicates that a sample is perfectly predicted by the second predictor z-plane ZP2, while a sample value of 11 indicates that the sample is predicted by the second predictor z-plane, but also requires a residual.

Figure 5:
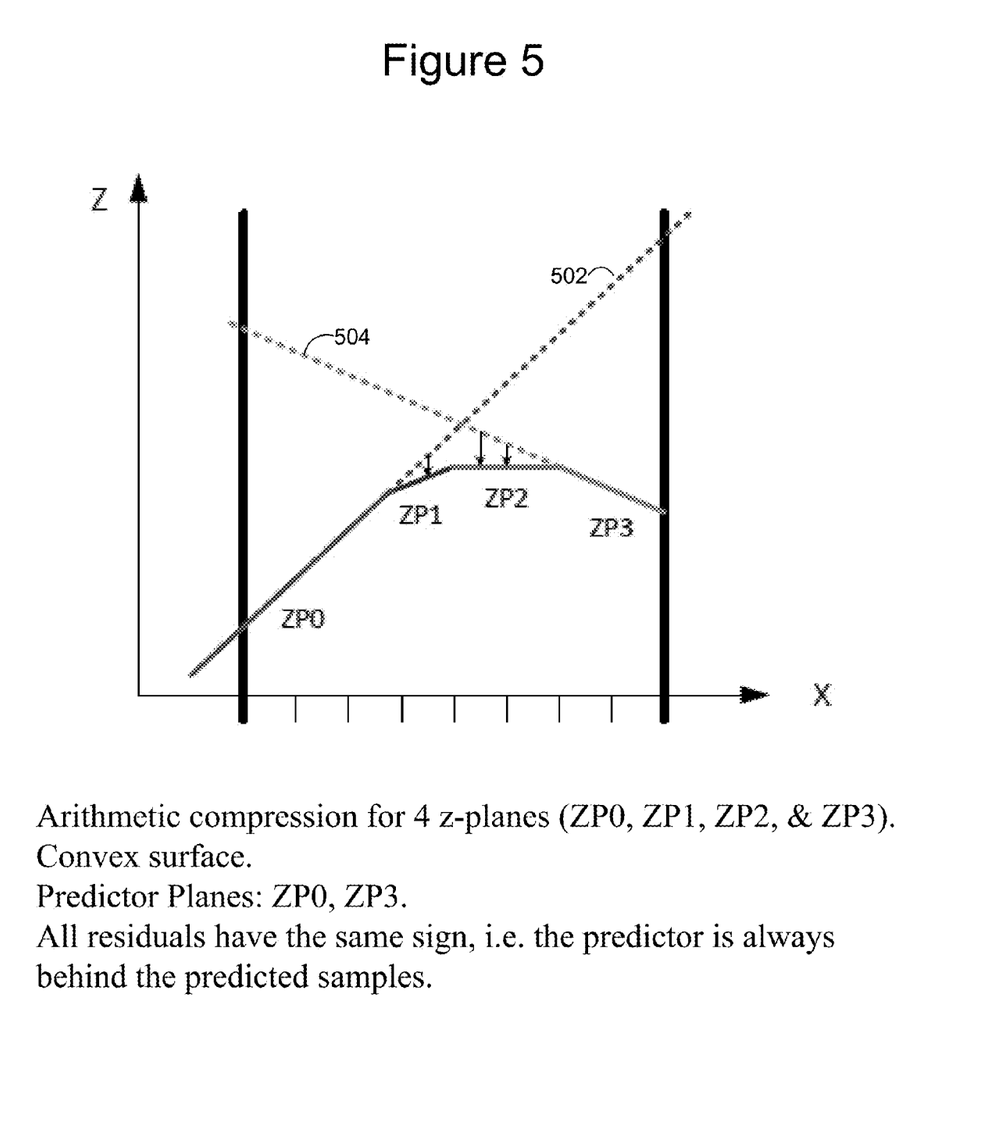
FIG. 5 illustrates an exemplary plotting of a plurality of z-planes to determine distances from predictor planes for each sample not covered by one of the predictor planes in accordance with an embodiment of the present invention.

As illustrated in FIG. 5, when a sample is not perfectly predicted by an associated predictor z-plane, a residual is calculated. FIG. 5 illustrates an arrangement of four z-planes ZP0, ZP1, ZP2, and ZP3 visible at a tile, plotted along an x and z axis. As illustrated in FIG. 5, these four z-planes are arranged as a convex surface. Because z-planes ZP0 and ZP3 are selected as predictor z-planes, residual values are calculated for those samples covered by z-planes ZP1 and ZP2. Line 502 represents those predicted z-values from predictor z-plane ZP0 (both predicted and perfectly predicted), while line 504 represents those predicted z-values from predictor z-plane ZP3 (both predicted and perfectly predicted). FIG. 5 illustrates that the residual values are the difference values between the actual values of those samples represented by z-planes ZP1 and ZP2 and the predicted values provided by the predictor z-planes ZP0 and ZP3 and their associated predicted value lines 502, 504. As will be discussed below, the residual values, illustrated in FIG. 5, will all have the same sign because the predictor line values 502, 504 are behind the z-planes ZP1 and ZP2.

Figure 6:
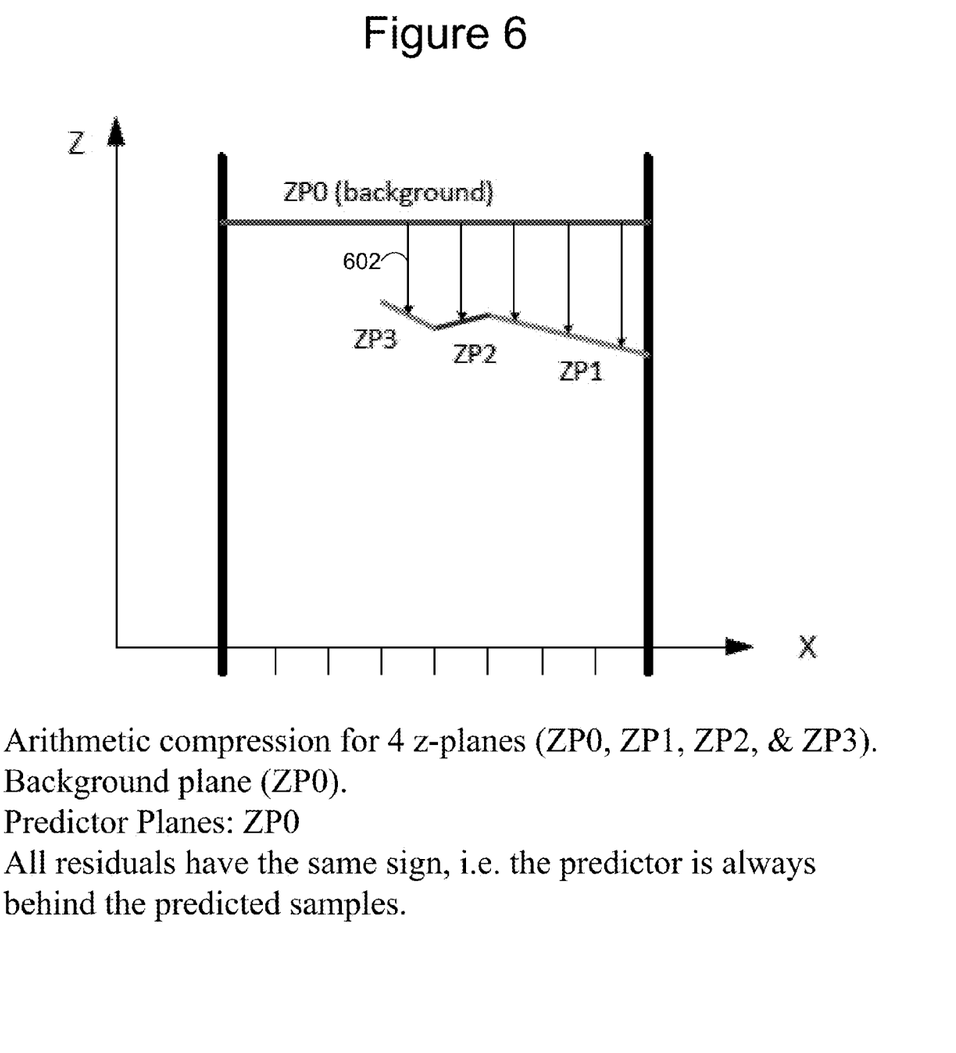
FIG. 6 illustrates an exemplary plotting of a plurality of z-planes to determine distances from a predictor plane for each sample not covered by the predictor plane in accordance with an embodiment of the present invention.

FIG. 6 illustrates another scenario where a z-plane (ZP0) is a background z-plane. Z-planes ZP1, ZP2, and ZP3 are each in front of the background z-plane ZP0. The background z-plane ZP0 may be selected as a predictor z-plane. As illustrated in FIG. 6, with a background z-plane, only the background z-plane will be selected as a predictor z-plane. As also illustrated in FIG. 6, residuals are determined for all samples covered by z-planes ZP1, ZP2, and ZP3. As illustrated in FIG. 6, the residual values are the difference values 602 between the actual z-values of those samples and the predicted z-values provided by the background z-plane ZP0.

Shader-Z Data Compressed with the Arithmetic Z-Compression Format:

As discussed herein, when the z-data for a tile is represented with shader-z data that comprises individual z-data values for each sample/pixel, the z-compression format that stores z-planes may not be used, as there are no z-planes representing these individual z-values. However, as discussed herein, for shader-z data, the arithmetic z-compression format may be used, even when there are no z-planes. A predictor z-plane candidate may be created based upon the z-value of a covered sample/pixel. For example, a tile's center pixel (and its sample(s)) may be selected as a plane anchor, when it is entirely covered by shader-z samples. In one exemplary embodiment, in shader-z mode, a candidate predictor for the source is a fake, constant-z plane generated from a sample/pixel z-value, covered by the source. When a predictor z-plane is created from shader-z data, only a single z-plane is created. There may be a plurality of alternative mechanisms for generating predictor z-planes from sample/pixel z values, the above should be considered simply one example.

Selecting Z-Planes to be used as Predictor Z-Planes:

There may be a plurality of strategies available for selecting the predictor z-planes from among the available z-planes visible at the tile. In one exemplary embodiment, one or more of the following criteria may be used for selecting predictor z-planes: z-planes with the largest coverage areas (a coverage criterion); z-planes that represent groups of triangles as defined by their distance from the origin (a distance criterion); and the z-planes that create the smallest compressed representation of the tile (a storage criterion). In one exemplary embodiment, one or more criteria may be evaluated in parallel and the resulting predictor z-planes and residuals with the best compression ratio selected. In one exemplary embodiment, a greatest weight may be placed on choosing z-planes that have the most coverage (the two largest z-planes) and consequentially the fewest number of residuals, and/or the smallest and most compact compressed representation (residuals represented with the smallest number of bits).

Figure 7A:
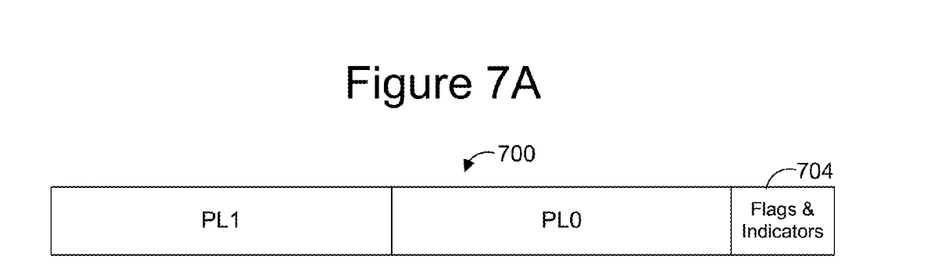
FIGS. 7A and 7B illustrate exemplary data storage formats for storing z-data in a z-buffer for a plurality of z-planes in accordance with an embodiment of the present invention.
Figure 7B:
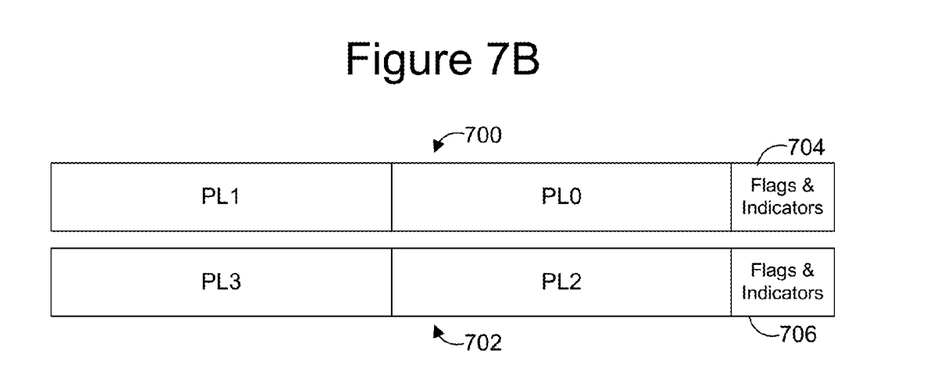

Z-Compression Formats:

FIGS. 7A and 7B illustrate storage formats for the z-buffer 318 that may be used for z-compression (i.e., z-compression format) as described herein. As illustrated in FIG. 7A, a first z-plane and a second z-plane may be stored in sections PL0 and PL1 of a first sub-packet 700, respectively. The z-data for a tile may be stored in a predetermined quantity of sub-packets 700, 702 in the frame buffer 310. A sub-packet may be defined as an access atom into the frame buffer 310, that is, the smallest amount of data that can be accessed (read/written) in the frame buffer 310. In one exemplary embodiment, two sub-packets 700, 702 may be set aside for storing z-planes, flags, and other bits as discussed herein. In one exemplary embodiment, each sub-packet comprises 32 bytes. As also illustrated in FIGS. 7A and 7B, a sub-packet 700, 702 may also have additional bits set aside for indicators, flags, and other bits 704, 706. FIG. 7B illustrates a pair of sub-packets 700, 702 formatted for holding pairs of z-planes in sections PL0 and PL1, and sections PL2 and PL3, respectively. As discussed herein, following z-compression format procedures, up to four z-planes may be stored for each tile, using two sub-packets 700, 702.

As described herein, while four or fewer z-planes representing the z-data for a tile may be stored as compressed z-data in the z-compression format, when there are five or more z-planes visible, the above described z-compression format will not work. At this time, the z-data for the tile can either be stored in an uncompressed format in the z-buffer with z-values for each sample or pixel in the tile, or the z-data can still be compressed using the arithmetic z-compression format described herein.

Arithmetic Z-Compression Formats:

An exemplary storage format suitable to store z-data under the arithmetic z-compression format may include the following information: an ownership mask, a residual mask, a quantity of predictor z-planes, predictor plane parameters, flags, indicators, and residuals. An exemplary ownership mask may indicate which sample or pixel is owned by which predictor z-plane. An exemplary residual mask may indicate which samples or pixels are not covered by a predictor z-plane (samples/pixels for which there are residual values). Exemplary parameters may comprise an anchor value and gradients (Ax+By+C).

As discussed herein, there are several scenarios that may be indicated by flags: flat z-planes (z-planes with coefficients A and B=0 and a constant z-value so that they are parallel or aligned to the screen), perfect predictors (where all residual values are 0 so that the residuals need not be stored explicitly), positive/negative residuals (all residuals for a z-plane are either all negative or positive and may be stored as unsigned integers) and an implied negative sign bit. As discussed herein, indicator flags may also be used to encode a tile's compression status. For example, a 2-bit compression status flag may be used to encode the following compression states: an uncompressed format, a single sub-packet z-compression format, a double sub-packet z-compression format, and an arithmetic z-compression format (using the same dual sub-packets). A residual bit size may also be indicated by a maximum residual field that tracks a quantity of bits that may be needed to store all of the residuals. In one embodiment, compression status bits that control how the bits in the sub-packets are interpreted are not part of the sub-packets and are stored separately. When an exemplary tile is stored uncompressed, all bits are needed to represent the individual z-values and there are no bits left to store the compression status, therefore, the compression status for a tile may be stored as part of a page-table entry.

As described herein, an arithmetic z-compression format may take advantage of the z-compression format by using one of the two sub-packets to store predictor z-planes (in more or less the same format that is used to store z-planes under the z-compression format). In one exemplary embodiment, a mask in the first sub-packet may be used to show which samples/pixels are owned by which predictor z-plane, while residuals may be stored in the second sub-packet, along with a mask that indicates which samples or pixels are predicted, or perfectly predicted by a z-plane.

Figure 8A:
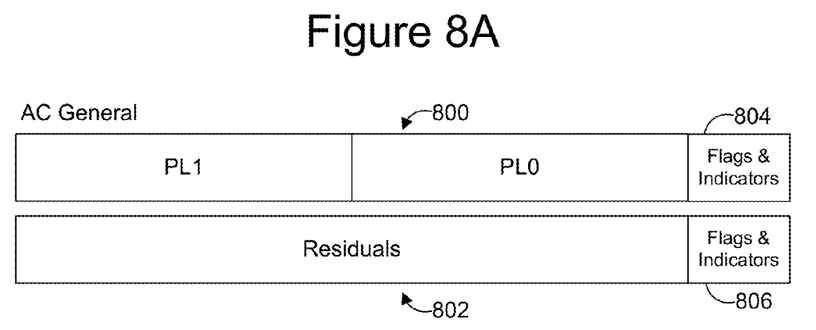
FIGS. 8A, 8B, and 8C illustrate exemplary data storage formats for storing z-data in a z-buffer for a plurality of predictor planes and residuals for samples not covered by the predictor planes in accordance with an embodiment of the present invention.
Figure 8B:
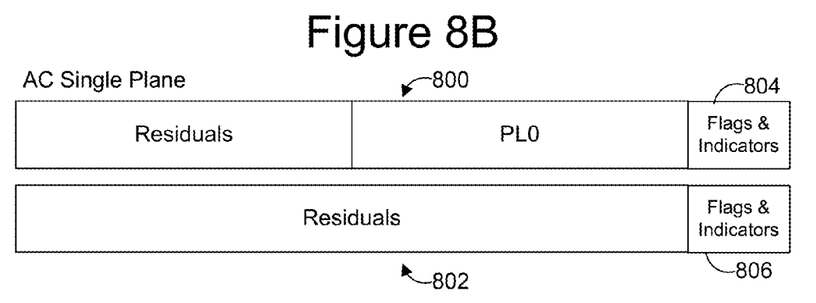
Figure 8C:
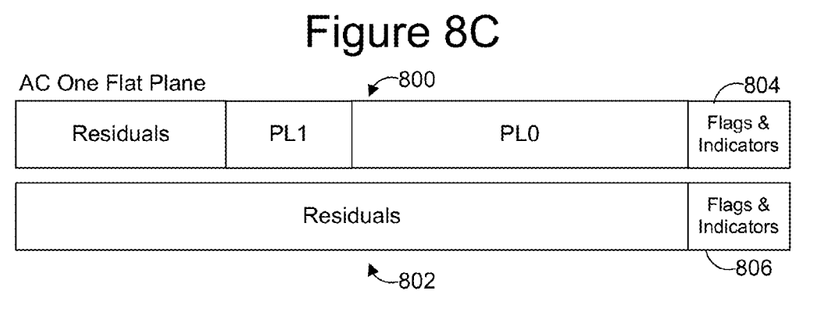

As illustrated in FIGS. 8A, 8B, and 8C, when z-data is compressed following arithmetic z-compression formats, three different scenarios are possible. In FIG. 8A, a general arithmetic z-compression format is illustrated, where a pair of predictor z-planes is stored in sections PL0 and PL1 of sub-packet 800, with residuals stored in sub-packet 802. In FIG. 8B, an arithmetic z-compression format is followed where only a single predictor plane is stored (this is similar to the situation illustrated in FIG. 6, where a background z-plane is used as a single predictor z-plane). With only a single predictor plane stored in section PL0 of sub-packet 800, residuals may be stored in the left-over portions of sub-packet 800, as well as the second sub-packet 802. In FIG. 8C, an arithmetic z-compression format is followed where a pair of predictor planes are selected and stored in sub-packet 800; however, because one of the selected predictor z-planes is a flat plane (with A and B values of 0), the flat plane may be stored in a format with fewer bits. As illustrated in sub-packet 800 of FIG. 8C, with one of the predictor z-planes a flat plane, there is additional space in sub-packet 800 for the storage of residuals (as well as the storage of residuals in sub-packet 802).

In one exemplary embodiment, a mask in the z-plane format for z-compression may be used to show which samples or pixels are owned by which predictor plane (either the predictor z-plane directly covers the pixel or it provides the basis for computing residual data to predict the pixel's z value). In a second sub-packet, the residuals may be stored along with a second mask that indicates which samples or pixels were predicted or perfectly predicted by a particular predictor z-plane. In one exemplary embodiment, a quantity of bits used to store each of the residual values is also indicated in the second sub-packet 802. As noted above, the number of bits per residual may change depending on current circumstances (number of bits needed to store the largest residual (positive or negative), all negative or positive z-values, a single predictor z-plane, or a flat z-plane, etc.). There may also be an indication in the second sub-packet 802 of the total quantity of bits required to store the residuals. This total residual value may be compared to a threshold value that is adjustable depending on the scenario. If the total quantity of bits required to store the residuals is above a threshold value, the current z-data may not be stored in a compressed format and will be stored uncompressed. In other words, when compressing z-data using the arithmetic compression format, additional z-planes may be accommodated for with predictor z-planes and residuals, so long as the predictor planes and the residuals all fit in the two sub-packets 800, 802 that have been allocated for storing arithmetically compressed z-data.

The formatted sections for indicator flags may be utilized to indicate what type of predictor z-planes are to be stored. For example, indicator bits may indicate that two normal predictor z-planes are to be stored. In one exemplary embodiment, normal predictor z-planes may be stored following the formatting of z-planes in z-compression procedures illustrated in FIGS. 7A and 7B. The indicator flags may also indicate where only a single predictor z-plane is to be stored, as illustrated in FIG. 8B, or where one of the two stored predictor z-planes is a flat plane, as illustrated in FIG. 8C. A flat z-plane is a z-plane where coefficients are such that A and B are zero, and the z-value is constant. Indicator bits may also be used to indicate whether all the residual values are of a same sign. When all the residual values are of a same sign, a residual may be stored without a sign and with fewer bits required, allowing for the storage of additional residuals.

Figure 9:
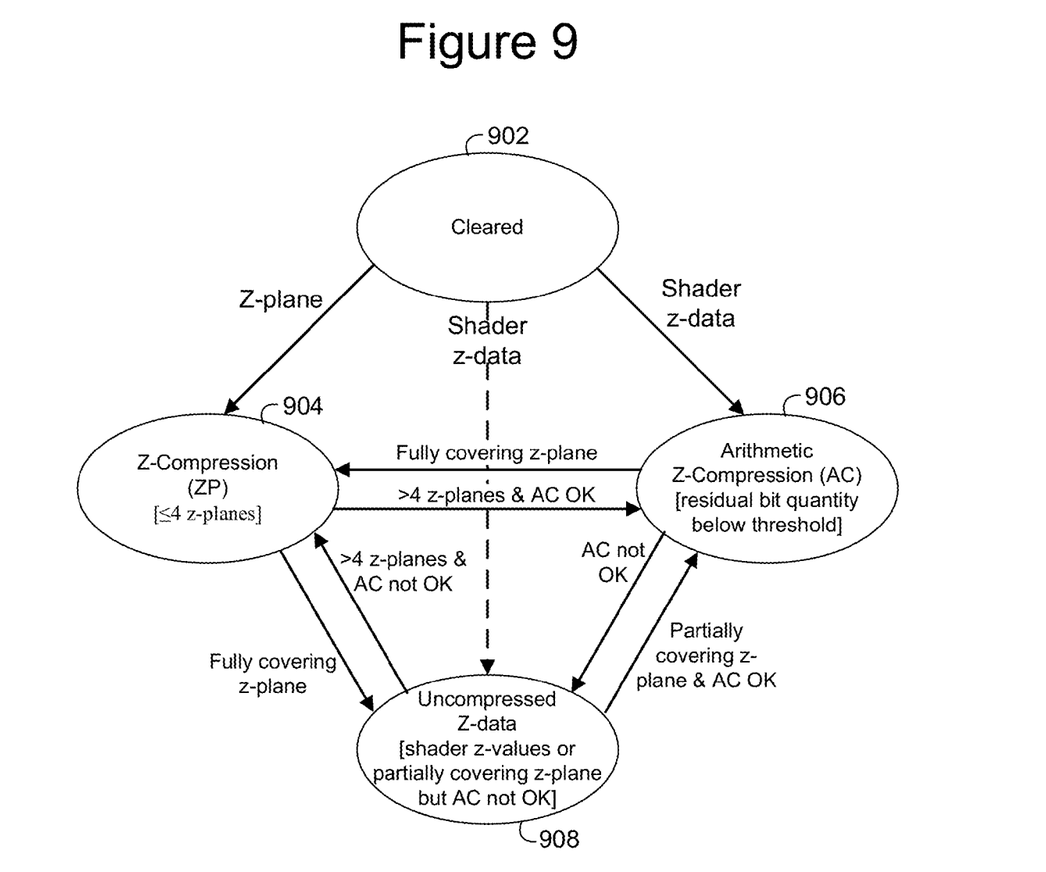
FIG. 9 illustrates an exemplary state diagram for illustrating z-compression format transitions.

Transitioning Between Different Z-Data Compression Formats:

FIG. 9 illustrates an exemplary state diagram for possible transitions between a z-compression format utilizing z-planes and an arithmetic z-compression format utilizing predictor z-planes and residuals. From an initial cleared state 902 of FIG. 9, the type of incoming data (shader-z or z-planes) determines whether the tile is represented with z-planes or arithmetically compressed. In one exemplary embodiment, as discussed herein, z-plane representations or individual z-data point (shader-z values) representations are possible. As illustrated in FIG. 9, when the z-data representations comprise z-planes, the state diagram transitions to state 904 for the z-compression format, however, if the z-data representations comprise shader-z values, the state diagram transitions to state 906 for the arithmetic z-compression format. In other words, the z-compression format selected (e.g. z-compression format and arithmetic z-compression format) may be based upon whether the incoming source tile is represented by z-planes or as shader-z values. FIG. 9 also illustrates that when the incoming shader-z data cannot be arithmetically compressed, the state diagram transitions to state 908 for the uncompressed format.

As also illustrated in FIG. 9, state diagram transitions between the z-compression format of state 904 and the arithmetic z-compression format of state 906 are also possible. For example, when the predictor z-planes completely cover the tile or all the residuals are perfect predictors, the state diagram may transition from the arithmetic z-compression format of state 906 to the z-compression format of state 904. Similarly, as noted above, when a tile is covered by more than four z-planes or comprises individual shader-z data, the z-compression format of state 904 cannot be used and the state diagram will transition to the arithmetic z-compression format of state 906. As also illustrated in FIG. 9, when the z-compression format of state 904 is not able to be used and the state diagram won't transition to the arithmetic z-compression format of state 906, the state diagram will transition to an uncompressed format of state 908. Similarly, if the state diagram had previously transitioned to the arithmetic z-compression format of state 906 and was no longer able to stay in this compression format, then the state diagram may transition from the arithmetic z-compression format of state 906 to the uncompressed format of state 908. As discussed herein, when the quantity of bits required to store residuals exceeds the threshold value, the arithmetic z-compression format cannot be used.

When the state diagram had previously transitioned to the uncompressed format of state 908, if the tile is now completely covered by a z-plane, the state diagram will transition to the z-compression format of state 904. When the state diagram had previously transitioned to the uncompressed format of state 908, if the tile is covered by two or more z-planes, the state diagram may transition to the arithmetic z-compression format of state 906. As discussed above, the state diagram may transition to the z-compression format of state 904 when the tile is covered by four or fewer z-planes, and the state diagram may transition to the arithmetic z-compression format of state 906 when the bits required to store the residuals for those samples or pixels not covered by one of the predictor z-planes is below a threshold.

Figure 10:
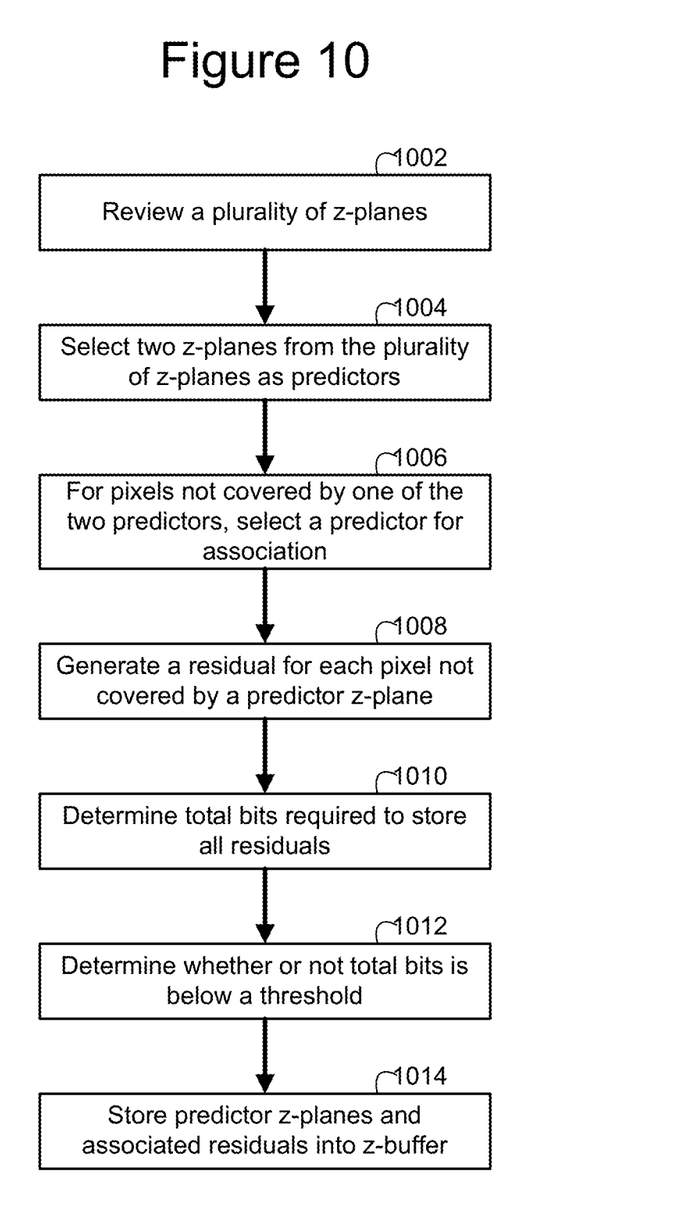
FIG. 10 illustrates an exemplary flow diagram, illustrating the steps of a computer implemented method for compressing z-planes in accordance with an embodiment of the present invention.

FIG. 10 illustrates an exemplary flow diagram illustrating the steps to a method for implementing an arithmetic z-compression format. As illustrated in step 1002 of FIG. 10, when a decision has been made to compress z-data using the arithmetic z-compression format, the z-planes visible on the tile are reviewed for their suitability to serve as candidate predictor z-planes. As discussed herein, the selection of predictor z-planes may include one or more separate or parallel reviews that consider a number of criteria (e.g., coverage criterion, distance criterion, and storage criterion). In one exemplary embodiment, the various criteria are considered, and after comparing the results for the candidate predictor z-planes, the criterion that results in a smallest and/or most compact, compressed representation is used.

In step 1004 of FIG. 10, two visible z-planes may be selected as predictor z-planes. If there are no existing z-planes (the tile only has shader-z data), then as discussed herein, a single flat z-plane may be created using a center-pixel z-value. In step 1006 of FIG. 10, for each sample or pixel not covered by a predictor z-plane, a predictor z-plane is selected for association with the uncovered sample or pixel. In scenarios where only a single predictor z-plane is selected, all uncovered samples or pixels will be associated with the single z-plane.

In step 1008 of FIG. 10, a residual value is determined for each sample or pixel not covered and correctly defined by a predictor z-plane. As discussed herein, the residual value will be a distance value between the predicted z-value provided by the associated z-plane and the actual z-value of the sample or pixel. In step 1010 of FIG. 10, a total quantity of bits required to store all residuals is determined and compared with a threshold value. In one exemplary embodiment, a threshold value is determined based upon the amount of storage available for residual values, which can vary depending on the storage format used to store the predictor z-planes. In step 1012 of FIG. 10, the quantity of residual bits is compared to the threshold value. If the threshold value is exceeded, then arithmetic z-compression may not be used and the tile will be stored in the z-buffer in an uncompressed format. If the threshold value is not exceeded, then the predictor z-planes and associated residuals, flags, and indicator bits will be stored in the assigned sub-packets of a z-buffer for the tile. As discussed herein, a first sub-packet may store the predictor z-plane(s) and the second sub-packet may store the residuals, residual signs, residual mask, flag bits, and indicator bits.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method for compressing graphics data comprising a plurality of z-planes and samples, the method comprising:
   selecting z-planes from the plurality of z-planes, wherein the selected z-planes are predictor planes;
   determining a residual for each sample not covered by one of the predictor z-planes, wherein a sample is covered by one of the predictor z-planes when the predictor plane correctly defines a z-value for the sample, and wherein a residual comprises a value that is a difference between a predicted z-value provided by one of the predictor z-planes and an actual z-value for the sample; and
   storing the predictor planes and the residuals in a z-buffer.

2. The method of claim 1, wherein the selecting z-planes from the plurality of z-planes comprises selecting z-planes that minimize a number of bits required to store residuals.

3. The method of claim 1, wherein selecting z-planes from the plurality of z-planes comprises selecting those z-planes which cover a largest number of samples.

4. The method of claim 1, wherein the storing the predictor planes and the residuals comprises storing a first mask that indicates predictor z-plane coverage and storing a second mask that indicates residual coverage, wherein a sample that is covered by the first mask but not the second mask is correctly defined by a predictor plane, and wherein further a sample that is covered by the first mask and by the second mask is predicted by a predictor z-plane and has a corresponding residual.

5. The method of claim 1, wherein residuals for a predictor z-plane are stored with a single sign bit when the residuals are all of a same sign, wherein the single sign bit indicates the sign of the residuals, and a flag indicates that all residuals have the same sign.

6. The method of claim 5, wherein a quantity of bits necessary to store a residual of a plurality of residuals that are all of the same sign are fewer than a quantity of bits necessary to store a residual of a plurality of residuals that are not all of the same sign.

7. The method of claim 1, wherein a predictor z-plane that is a constant-z plane requires fewer bits to store than a predictor z-plane that is not a constant-z plane.

8. A method for compressing graphics data comprising samples, the method comprising:
   selecting at least one z-plane visible at a tile, wherein the at least one selected z-plane is a predictor z-plane;
   determining a residual for each sample not covered by the at least one predictor z-plane, wherein a sample is covered by a predictor z-plane of the at least one predictor z-plane when the predictor z-plane correctly defines a z-value of the sample, and wherein a residual comprises a value that is a difference between a predicted z-value provided by one of the predictor z-planes and an actual z-value for the sample; and
   storing the at least one predictor z-plane and residuals in a z-buffer.

9. The method of claim 8, wherein the selecting at least one z-plane comprises selecting two z-planes from a plurality of z-planes visible at the tile.

10. The method of claim 8, wherein the at least one predictor z-plane is a constant-z plane created from a distance value of a central sample in the tile.

11. The method of claim 9, wherein the selecting two z-planes from the plurality of z-planes comprises one of:
   selecting two z-planes that minimizes the number of bits required to store the residuals; and
   selecting two z-planes that cover a largest number of samples.

12. The method of claim 8, wherein the storing the at least one predictor z-plane and the residuals comprises storing a first mask that indicates predictor z-plane coverage and storing a second mask that indicates residual coverage, wherein a sample that is covered by the first mask but not the second is correctly defined by a predictor z-plane, and wherein further a sample that is covered by the first mask and by the second mask is predicted by a predictor z-plane and will have a corresponding residual.

13. The method of claim 8, wherein residuals for a predictor z-plane are stored with a single sign bit when the residuals are all of a same sign, wherein the single sign bit indicates the sign of the residuals, and a flag indicates that all residuals have the same sign, wherein a quantity of bits necessary to store a residual of a plurality of residuals that are all of the same sign are fewer than a quantity of bits necessary to store a residual of a plurality of residuals that are not all of the same sign.

14. The method of claim 8, wherein a predictor z-plane that is a constant-z plane requires fewer bits to store than a predictor z-plane that is not a constant-z plane.

15. A method for compressing graphics data, the method comprising:
   selecting a z-data compression format from a plurality of z-data compression formats, wherein a compression format is used to compress z-data by selecting one or more z-planes to represent the z-data,
      wherein a first compression format stores a plurality of z-planes representing the z-data,
      wherein a second compression format stores a plurality of predictor z-planes selected from a plurality of z-planes representing the z-data, and
      wherein the selecting a z-data compression format from a plurality of z-data compression formats is based upon an evaluation of at least one criterion of a plurality of criteria, and
   storing the selected z-planes in a z-buffer.

16. The method of claim 15, wherein a criterion of the plurality of criteria comprises an evaluation of a quantity of z-planes visible at a tile.

17. The method of claim 16, wherein the first z-data compression format is selected when the quantity of visible z-planes is equal to or less than four.

18. The method of claim 16, wherein the second z-data compression format is selected when the quantity of visible z-planes is greater than four, wherein the second z-data compression format further stores residual data for each sample not covered by one of the predictor z-planes, wherein a residual comprises a value that is a difference between a predicted z-value provided by one of the predictor z-planes and an actual z-value for the sample, and wherein a sample is covered by a predictor z-plane when the predictor z-plane correctly defines a z-value of the sample.

19. The method of claim 16, wherein a third z-data compression format is selected when the quantity of visible z-planes is greater than four and when a quantity of bits required to store residuals is greater than a threshold value, wherein the third z-data compression format is used to store individual z-data for each sample.

20. The method of claim 15, wherein a criterion of the plurality of criteria comprises an evaluation of a quantity of bits required to store residuals.

* * * * *